US007645826B2

(12) United States Patent
Sophiea et al.

(10) Patent No.: US 7,645,826 B2
(45) Date of Patent: Jan. 12, 2010

(54) WATER BASED DAMPER

(75) Inventors: Daniel P. Sophiea, Lake Orion, MI (US); Geng Lin, Rochester Hills, MI (US); Michael K. Munyan, Rochester Hills, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 584 days.

(21) Appl. No.: 11/357,672

(22) Filed: Feb. 17, 2006

(65) Prior Publication Data
US 2006/0189743 A1    Aug. 24, 2006
US 2008/0171820 A9    Jul. 17, 2008

Related U.S. Application Data

(60) Provisional application No. 60/654,731, filed on Feb. 18, 2005.

(51) Int. Cl.
*C08K 9/04* (2006.01)

(52) U.S. Cl. ............... 524/445; 524/556; 427/372.2
(58) Field of Classification Search ............... 524/445
See application file for complete search history.

(56) References Cited

U.S. PATENT DOCUMENTS

| | | | | |
|---|---|---|---|---|
| 5,041,487 A | * | 8/1991 | Kissel | 524/377 |
| 5,550,180 A | * | 8/1996 | Elsik et al. | 524/430 |
| 6,381,873 B1 | * | 5/2002 | Peremychtchev et al. | 34/497 |
| 6,686,033 B1 | * | 2/2004 | Chacko | 428/221 |
| 2004/0072943 A1 | * | 4/2004 | Morihiro et al. | 524/556 |

FOREIGN PATENT DOCUMENTS

| | | |
|---|---|---|
| EP | 1403347 | 3/2004 |
| JP | 10101851 | 4/1998 |
| JP | 11334653 | 12/1999 |
| JP | 2000178499 | 6/2000 |

OTHER PUBLICATIONS

Machine Translation of JP-2000/355,602 A.*
http://www.dow.com/ucarlatex/prod/vinyl/.*
http://www.dow.com/PublishedLiterature/dh_003f/0901b8038003f48a.pdf?filepath=ucarlatex/pdfs/noreg/309-00044.pdf&fromPage=GetDoc.*

* cited by examiner

*Primary Examiner*—David Wu
*Assistant Examiner*—Vu Nguyen
(74) *Attorney, Agent, or Firm*—Robert A. Diaz

(57) ABSTRACT

Latex-based compositions, and methods of forming the same, that are useful to dampen noise and vibrations, are disclosed. The compositions can be applied to and adhered to a substrate. The compositions comprise latex and at least one filler. The compositions form microcracks during drying and/or curing to aid in the removal of water from the compositions.

29 Claims, 3 Drawing Sheets

WATER BASED DAMPER

CROSS-REFERENCE TO RELATED APPLICATION

This application claims the benefit of U.S. Provisional Application No. 60/654,731 filed Feb. 18, 2005, the entire specification of which is expressly incorporated herein by reference.

FIELD OF THE INVENTION

The present invention relates to a water based composition that is useful in providing noise and vibration damping properties to substrates.

BACKGROUND OF THE INVENTION

Many apparatus or machines generate noise and vibrations during operation. In addition, vehicles generate noise and vibrations during operation. Such noise and vibrations can be distracting or annoying to people who use or come into contact with these machines or apparatus. This is particularly problematic with respect to automobiles. In automobiles, asphalt based pads are typically laid on the floorboard to dampen the noise and vibration coming into the passenger compartment. The problem is that floorboards tend to have multiple indentations and shapes, which are difficult to conform to. Often, individual and various shaped asphalt vibration damping pads (usually referred to as "mastic pads") are manually placed in discreet areas to treat the floorboard area of vehicles. Manual applications of individually shaped parts are an expensive operation in the vehicle assembly process and application and repeatability and reliability is often substandard.

Additionally, the under body of an automobile is subjected to debris during operation. This debris can cause the coating on the underbody substrate to chip.

It is desirable to have a composition that can be applied in such a manner so as to be able to conform to the shape of the substrate. Some patents disclose the use of 100 percent solid content epoxy resin sprayable compositions for this use. For example, see World Patent 99/16840. The compositions disclosed function well, but are quite expensive to use. It is also desirable to provide a composition that aids in chip resistance.

Others disclose latex compositions that are to some degree cross-linked. Crosslinking agents or pre-crosslinked polymers result in relatively good bake characteristics (bake characteristics and bakeability generally refer to the ability to remove water from the composition) but result in relatively poorer vibration damping properties and lower mechanical properties.

Another latex composition is disclosed in U.S. Pat. No. 6,872,761 to LeStarge. This composition includes at least two latexes, one with a glass transition temperature $T_g > 0$ and one with a $T_g < 0$.

Other ways to improve bakeability are also known. These include controlling the material itself, such as by crosslinking the polymer quickly. Another technique has been to pre-crosslink the surface of a film. Finally, lower levels of latex can be used in the formula. Each of these methods results in good bakeability, but a generally lower damping capability.

It is further desirable to provide a near zero volatile organic content (VOC) composition which is conformable to odd shapes and surfaces, can provide good damping properties and can preferably be sprayed or stream applied to the vehicle structure on the sealer application deck. Typically, to achieve the above requirements, materials are required to be solvent borne to reduce viscosity for spray or stream application or are hot melt applied. Application on the sealer deck is required to utilize the benefit of the paint curing ovens, thereby maximizing material conformability and resulting in coalescence or curing to achieve film formation. In general, water containing compositions are not applicable for sealer or paint deck applications because the water vaporizes during the curing process and results in voids, cracking or loss of adhesion to the substrate. To accommodate water-based emulsions in sealer deck applications, one must generally apply low heat for long times to gradually allow water vapor to escape without the formation of voids or cracks due to film formation. It is desirable to provide a composition which is low VOC, water based, can be dried in automobile ovens, can be spray, stream or swirl, etc. applied and which gives excellent damping properties.

Further, current compositions are typically applied to horizontal surfaces in the vehicle such as but not limited to the floor pan. It is desirable to provide a composition that can also be more readily applied to the vertical surfaces such as but not limited to door panels or body panels. It is further desirable to provide a composition that can be cured at room temperature or thermally cured. It is further desirable to have a composition that has higher density, higher solids content, better mechanical properties and better adhesion to metal and painted substrates.

SUMMARY OF THE INVENTION

The present invention relates to a composition that is useful to dampen noise and vibrations which composition can be applied to and adhered to a substrate.

In accordance with a first embodiment of the present invention, a latex-based composition is provided, comprising: (1) latex in an amount of between about 20 weight percent to about 40 weight percent based on the total weight of the composition; and (2) at least one filler in an amount of between about 45 weight percent to about 70 weight percent based on the total weight of the composition, wherein said composition forms microcracks in or on a surface thereof.

In accordance with a first alternative embodiment of the present invention, a latex-based composition is provided, comprising: (1) latex in an amount of between about 20 weight percent to about 40 weight percent based on the total weight of the composition, wherein said latex has a mean particle size in the range of about 1000 to about 5000 Angstroms; and (2) at least one filler in an amount of between about 45 weight percent to about 70 weight percent based on the total weight of the composition, wherein said composition forms microcracks in or on a surface thereof upon drying or curing.

In accordance with a second alternative embodiment of the present invention, a method for forming a latex-based composition is provided, comprising: (1) providing latex in an amount of between about 20 weight percent to about 40 weight percent and having a mean particle size of between about 1000 and 5000 Angstroms; (2) providing at least one filler in an amount of between about 45 weight percent to about 70 weight percent; and (3) combining said latex and said at least one filler.

In accordance with a third alternative embodiment of the present invention, a method of forming a damper is provided, comprising: (1) mixing a latex and at least one filler to form a latex-based composition; (2) applying said composition to a substrate; and (3) curing said composition, wherein said composition forms a plurality of microcracks therein or thereon for aiding in releasing water from said composition.

DETAILED DESCRIPTION OF THE INVENTION

Figure 1:
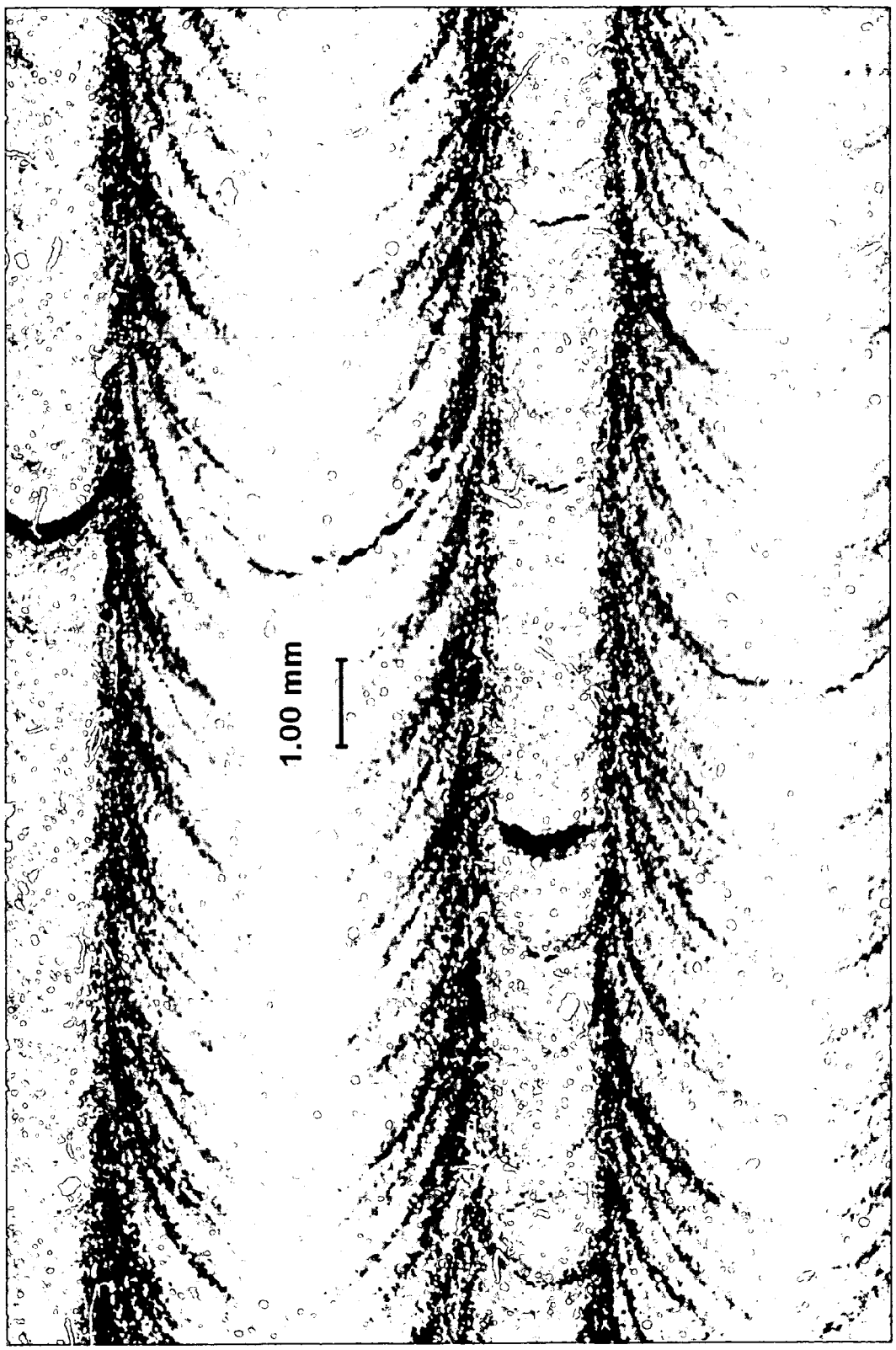
FIG. 1 is a photomicrograph showing microcracks.

It should be appreciated that the weight percentages disclosed herein of the components and/or subcomponents of the composition of the present invention are based on the total weight of the composition.

The composition of the present invention comprises an emulsion-based composition comprising a polymer base in water. The composition may also include one or more fillers. Additionally, the composition may include a surfactant and other additives.

In the preferred embodiment, the compositions are comprised of anionic-stabilized specific latexes with controlled particle size distribution. The preferred mean particle size range is between about 1000 to about 5000 Angstroms. Still more preferred, mean particle sizes are in the range of between about 2250 to about 4500 Angstroms. Preferably, the latexes have a glass transition temperature ($T_g$) in the range of about 0° C. to about 50° C. Further, the composition preferably has a relatively high specific gravity, for example, between about 1.4 to about 1.8.

It is preferred that the composition, according to the present invention, have about 80 weight percent minimum of total solids. Total solids refer to NVM or non-volatile material.

The composition preferably comprises organic latex. It should be appreciated that more than one type of latex may be used in the practice of the present invention. By way of a non-limiting example, latexes used in the present composition are preferably based on acrylic copolymers or vinyl acrylic. Additionally, the latexes may be based on styrene acrylate or styrene butadiene. It has been found that the acrylic copolymers or vinyl acrylic latex compositions provide better damping characteristics when used in the present composition. While not being bound to any specific theory of the operation of the present invention, it is believed that these compositions are better able to vibrate due to lower crosslinking than other latex compositions. The present formulation generally allows for more latex content in the composition while still allowing good bakeability. It is believed that greater latex content in the composition provides increased damping performance. It will be appreciated that the amount of wet latex used may vary with the type of latex used. For example, when the latex used is The Dow Chemical Company UCAR 367 (based on vinyl acrylate) when 35 weight percent of latex is used in the formula. This latex has about 55 weight percent NVM and yields 18.7 weight percent latex solids in the final composition. Using this latex, it is preferred that the weight percent latex solids (NVM) in the final composition be in the range of about 15 weight percent to about 20 weight percent, with a most preferred range being between about 18 and about 19 weight percent.

In another example, when the latex used is Dow Reichold Specialty Latex XU31567 (a styrene-butadiene based latex), 35 weight percent latex is used in the formula. This latex has about 45 weight percent and NVM and yields about 15.75 weight percent latex solids (NVM) in the final composition. Using this latex, it is preferred that the weight percent latex solids be in the range of about 14 weight percent to about 16 weight percent with a most preferred range of about 15 weight percent to about 16 weight percent.

The latex component, i.e., both the liquid and solid subcomponents, is preferably present in an amount of at least 20 weight percent, based on the total weight of the composition. In accordance with another aspect of the present invention, the latex component, i.e., both the liquid and solid subcomponents, is more preferably present in an amount of at least 28 weight percent, based on the total weight of the composition. In accordance with still another aspect of the present invention, the latex component, i.e., both the liquid and solid subcomponents, is most preferably present in an amount of at least 30 weight percent, based on the total weight of the composition.

The latex component, i.e., both the liquid and solid subcomponents, is preferably present in an amount of about 20 to about 40 weight percent, based on the total weight of the composition. In accordance with another aspect of the present invention, the latex component, i.e., both the liquid and solid subcomponents, is more preferably present in an amount of about 28 to about 35 weight percent, based on the total weight of the composition. In accordance with still another aspect of the present invention, the latex component, i.e., both the liquid and solid subcomponents, is most preferably present in an amount of about 30 to about 34 weight percent, based on the total weight of the composition.

The presence of fillers in the emulsion may enhance the damping performance of the composition, physical properties, and/or the rheology of the emulsion. In order for the composition to be spray, stream or swirl applicable and to give enhanced damping properties, the fillers are preferably low oil absorption fillers. A low oil absorption filler preferably exhibits an oil absorption of less than 15 gram/100 gram. It will be appreciated that the oil absorption range provided is preferred and that fillers having oil absorption outside the preferred range may be used within the scope of the present invention.

The filler also preferably provides good damping properties. The filler level should be selected to avoid raising the viscosity of the composition to a level such that the composition cannot be applied by the desired application method, such as but not limited to spray, stream or swirl methods. Generally low surface area fillers give lower oil absorption. Preferably the low surface area or low oil absorption fillers comprise alkaline earth metal carbonates, alkaline metal carbonates such as but not limited to calcium magnesium carbonate and calcium carbonate. Other fillers may include mica, feldspar, dolomite, barium sulfate, clay, glass, mixtures of any of these or other fillers known in vibration damper coating compositions. The preferred range of fillers is from about 45 weight percent to about 70 weight percent, based on the total weight of the composition, and to most preferred range of from about 55 weight percent to about 65 weight percent, based on the total weight of the composition. It is desirable to have a composition that is relatively shear stable. This helps allow more filler into the composition. If the composition is not stable, it tends to gel. This gelling hinders the application of the composition onto the substrate.

The fillers may be chosen to enhance the rheology. For example, it has been found that the use of a clay or clay-type filler enhances the rheology of the latexes. It is preferred that the clay filler be present in an amount of between about 1.5 weight percent to about 2.5 weight percent, based on the total weight of the composition. Still more preferred, the clay filler is present in an amount of between about 1.8 weight percent to about 2.2 weight percent, based on the total weight of the composition.

Once such example of a clay filler is ATTAGEL 40 which is readily commercially available from Engelhard Corp. (Iselin, N.J.). ATTAGEL 40 is a relatively fine-milled attapulgite clay that provides excellent thickening and thixotropic performance in high-quality water-borne systems, such as latex. It should be appreciated that other types of ATTAGEL brand clay products can be used in the practice of the present invention, including but not limited to ATTAGEL 30, ATTAGEL 50, and/or the like.

Another type of filler that may be used in the practice of the present invention is marketed under the trade name EXPANCEL, which is readily commercially available from Akzo Nobel (Arnhem, The Netherlands). EXPANCEL microspheres are small spherical plastic particles. The microspheres consist of a polymer shell encapsulating a gas. When the gas inside the shell is heated, it increases its pressure and the thermoplastic shell softens, resulting in a significant increase in the volume of the microspheres. If the EXPANCEL filler was used in the composition of the present invention, the requirements of the ATTAGEL 40 filler concentration needed to maintain good bakeability would be decreased, perhaps by as much as 50%. That is, for example, the weight percent of the ATTAGEL 40 clay filler can be reduced in half, e.g., about 0.8 to about 1.2 weight percent, based on the total weight of the composition, in conjunction with about 0.5 to about 1 weight percent EXPANCEL, based on the total weight of the composition.

Other additives may be added to impart various features to the composition. By way of a non-limiting example, pigments, microbicides, defoamers and/or the like may be used within the context of the present invention. In the preferred formulation, pigments are preferably present in a range of from about 0.1 weight percent to about 1 weight percent, based on the total weight of the composition. Pigments are most preferred in an amount of between about 0.1 weight percent to about 0.2 weight percent, based on the total weight of the composition.

In the preferred formulation, microbicides are preferably present in a range of from about 0.1 weight percent to about 1 weight percent, based on the total weight of the composition. Microbicides are most preferred in an amount of between about 0.1 weight percent to about 0.2 weight percent, based on the total weight of the composition.

Defoamers are preferably present in a range of from about 0.01 weight percent to about 1 weight percent, based on the total weight of the composition. Defoamers are most preferred in an amount of between about 0.03 weight percent to about 0.2 weight percent.

Dispersants are also preferably used in the composition. Dispersants are preferably anionic materials used to stabilize the emulsion. Preferably the dispersant is present in the amount of between about 0.1 weight percent to about 1 weight percent, based on the total weight of the composition. More preferably, the dispersant is present in an amount of between about 0.1 weight percent to about 0.5 weight percent, based on the total weight of the composition. It will be appreciated that any suitable dispersant may be used.

Preferably, the composition of the invention further comprises a surfactant, solvent, or a plasticizer that improves rheology and the bakeability of the composition. Bakeability, as that term is used herein, it is meant to include the ability of the composition to be dried at elevated temperatures without destroying the coating and damping efficacy of the dried composition. The efficacy of the composition can be degraded by excessive cracking, bubble or void formation, tunneling (e.g., formation of air tunnels in the composition) or delamination of the composition from the substrate.

Any surfactant may be used such as but not limited to anionic and nonionic surfactants. Preferred classes of surfactants include alkyl phenoxy alkanols, alkyl phenoxy alkoxylated alkanols or lignosulfates. More preferred classes of surfactants include alkyl phenoxy alkanols and akyl phenoxy alkoxylated alkanols. Preferred surfactants include non-ionic surfactants such as but not limited to Igepal Co 530 branched ethyloxylated nonyl phenol, Co 630 made by Rhone Poulenc nonylphenoxy poly(ethylenoxy)ethanol, TRITON™ X45 octylphenoxy ethanol surfactant and TRITON™ CF10 modified alkyl aryl ether available from The Dow Chemical Company (Trademark of Union Carbide), and anionic surfactants, such as but not limited to PC 1480 sodium lignosulfate. A more preferred surfactant is TRITON™ X45 surfactant. A sufficient amount of surfactant is used to enhance application of the emulsion, i.e., the composition is not too viscous, and which enhances the drying or bakeability of the composition. Preferably the amount of surfactant in the emulsion is about 0.15 weight percent or greater, based on the total weight of the composition.

The composition of the invention can be applied using any conventional technique. Preferably the composition of the invention is applied by multi-stream application ("MSA"). The viscosity of the composition may be adjusted to fit the desired application technique.

It has also been found that latexes, according to the present invention, yield increased damping properties. Without being bound to any specific theory of the operation of the present invention, these properties are thought to be as a result of controlling at least the mean particle size, chemical type and concentration, film formulation, temperature and rheology. The composition provided herein includes a plurality of microcracks or microvoids that are formed during curing. The terms "microcracks" and "microvoids" are used to designate areas that have small openings that allow water to escape during the curing process, and may be used synonymously throughout. These microcracks aid in the bakeability by providing areas for water to escape during the curing process. The microcracks are sufficiently small so as to not degrade the efficiency of the composition. These microcracks may or not be visible to the unaided eye. FIG. 1 is a photomicrograph showing the microcracks or microvoids of the present invention (see especially the black curved lines).

Four specific examples, i.e., Examples I-IV, of the emulsion according to the present invention were prepared as set forth below. The following examples are provided for illustrative purposes only and are not intended to limit the scope of the claims. Unless otherwise stated all parts and percentages are by weight.

| EXAMPLE I | | |
| --- | --- | --- |
| MATERIAL | DESCRIPTION | WEIGHT PERCENT |
| UCAR 301 | Latex | 30.27 |
| TAMOL 850 | Dispersing agent | 0.14 |
| TRITON X-45 | Surfactant | 0.86 |
| DOLOCRON 4512 | $CaCO_3$ - filler | 57.97 |
| MONARCH 120 | Carbon Black - pigment | 0.1 |
| KATHON LX 1.5 | Microbicide | 0.1 |
| CUSTERMICA A325 | Mica - filler | 0 |
| ATTAGEL 40 | Clay - filler | 1.87 |
| MICA FS 350 | Mica - filler | 3.75 |
| Water | | 4.90 |
| SURFYNOL DF 210 | Defoamer | 0.04 |

The specific gravity of the formulation is 1.7. The total solid content of the formulation is 84 weight percent, based on the total weight of the composition.

EXAMPLE II

| MATERIAL | DESCRIPTION | WEIGHT PERCENT |
|---|---|---|
| UCAR 301 | Latex | 30.85 |
| TAMOL 850 | Dispersing agent | 0.14 |
| TRITON X-45 | Surfactant | 0.56 |
| DOLOCRON 4512 | $CaCO_3$ - filler | 56.08 |
| MONARCH 120 | Carbon Black - pigment | 0.09 |
| KATHON LX 1.5 | Microbicide | 0.09 |
| CUSTERMICA A325 | Mica - filler | 0 |
| ATTAGEL 40 | Clay - filler | 1.91 |
| VS 550 | Glass bubbles - filler | 2.8 |
| CUSTERMICA A350 | Mica - filler | 2.24 |
| Water | | 5.19 |
| SURFYNOL DF 210 | Defoamer | 0.04 |

The specific gravity of the formulation is 1.5. The total solid content of the formulation is 83 weight percent, based on the total weight of the composition.

EXAMPLE III

| MATERIAL | DESCRIPTION | WEIGHT PERCENT |
|---|---|---|
| UCAR 367 | Latex | 33.25 |
| TAMOL 850 | Dispersing agent | 0.15 |
| TRITON X-45 | Surfactant | 0.15 |
| DOLOCRON 4512 | $CaCO_3$ - filler | 53.4 |
| MONARCH 120 | Carbon Black - pigment | 0.1 |
| KATHON LX 1.5 | Biocide | 0.15 |
| CUSTERMICA A325 | Mica - filler | 2.02 |
| ATTAGEL 40 | Clay - filler | 2.12 |
| VS 550 | Glass bubbles - filler | 3.02 |
| Water | | 5.54 |
| SURFYNOL DF 210 | Defoamer | 0.1 |

The specific gravity of the formulation is 1.5. The total solid content of the formulation is 80 weight percent, based on the total weight of the composition.

EXAMPLE IV

| MATERIAL | DESCRIPTION | WEIGHT PERCENT |
|---|---|---|
| UCAR 367 | Latex | 32.19 |
| TAMOL 850 | Dispersing agent | 0.2 |
| TRITON X-45 | Surfactant | 0.2 |
| DOLOCRON 4512 | $CaCO_3$ - filler | 56.66 |
| MONARCH 120 | Carbon Black - pigment | 0.1 |
| KATHON LX 1.5 | Biocide | 0.15 |
| CUSTERMICA A325 | Mica - filler | 4 |
| ATTAGEL 40 | Clay - filler | 2.1 |
| Water | | 4.3 |
| SURFYNOL DF 210 | Defoamer | 0.1 |

The specific gravity of the formulation is 1.7. The total solid content of the formulation is 82 weight percent, based on the total weight of the composition.

In each of Examples I-IV, the latex provided is available from The Dow Chemical Company under the brand name set forth. The Dow UCAR 301 is based on vinyl acrylate and possesses abrasion resistance, and high glass transition temperatures that aid in vibration damping in the temperature ranges required for automotive applications, peak damping temperature of between about 25° C. to about 40° C. The latex itself has a nominal solids content of about 62 weight percent, based on the total weight of the composition, and nominal particle size of about 0.4 microns. The addition of the anionic dispersant allows for good viscosity stability at high filler loading.

Dow UCAR 367 is based on a vinyl acetate-acrylic copolymer resin. This latex also provides abrasion resistance and high glass transition temperatures.

Another latex that can be used is Dow Rheichold Specialty Latex XU 31567. This compound is based on a styrene butadiene resin. Although such a latex may not have as high damping as the latex resins set forth above, this latex, with proper particle size distribution anionically charged, provides good bake characteristics and mechanical properties.

The composition of the present invention can be prepared in any number of suitable ways. An illustrative example is presented below of a methodology for combining the various components of the composition of the present invention.

The equipment used included a heavy duty electric stirrer, 2 inch impeller blades, and a one quart vessel (e.g., for 1000 g product). The procedure included a mixing speed that was controlled at 500-700 rpm. The following materials were initially added to the vessel: 322 g UCAR latex 367, 43 g water, 2 g dispersing agent (e.g., TAMOL 850), 2 g TRITON X-45, 1 g MONARCH 120, 1.5 g KATHON LX 1.5, and 21 g ATTAGEL 40. This mixture was then mixed for 3-4 minutes. Then, 40 g CUSTERMICA A 325, 567 g DOLOCRON 4512, and 1 g SURFYNOL DF 210 were added and then mixed for 3-4 minutes. The resulting composition was then discharged from the vessel.

The composition of the invention can be applied to a substrate using any conventional process known to one skilled in the art. Included in such conventional processes are casting, extrusion, spray application and swirl application. Swirl application means extrusion of a thin diameter bead of material while the application nozzle is swirled in a circular motion, resulting in a circular pattern drawn onto the substrate. When done correctly, the swirl pattern covers the intended application area completely, without large voids. Preferably, the composition is applied using an MSA or a swirl application. That is, the MSA application includes a bar with several holes that is used and the composition extrudes through the holes and is applied on the substrate.

The composition preferably exhibits sufficient (i.e., high) yield strength so that it does not re-flow too readily after application onto the substrate. If the applied composition re-flows too readily, it will inhibit the formation of the microcracks.

In a preferred embodiment, after applying the composition to the substrate, the substrate with the composition applied thereto is subjected to conditions such that the composition is dried. Preferably this is achieved by heating the substrate with the composition applied thereto to a temperature at which water is driven out of the composition. During the drying and/or curing, the composition forms the microcracks, as discussed below.

The microcracks appear within the MSA-applied film of the composition after it has seen normal paint shop bake conditions. The individual streams that make up the panel remain intact on the surface with very little reflow onto itself. Small microcracks appear after bake and act as passageway for water vapor release, resulting in a uniform continuous dried patch of the composition. These microcracks are varied in size, and may be positioned either perpendicular to the individual stream of composition, or along the stream-bottom material interface. These microcracks do not propagate and result in large cracks that may be seen along the entire length of the panel. The formation of these small microcracks are typically seen when the composition exhibits high degree of rheology, resulting in a contoured stream of material having increased surface area (as compared to a smooth, drawn or sprayed patch of material).

Lower temperatures are preferred from a standpoint of getting the best results. In those embodiments where drying time is not an issue, temperatures at ambient up to about 90° C., preferably up to about 60° C. are used. In some environments it is necessary to use a high temperature environment to dry the composition, such as but not limited to where the substrate is an automobile. Preferably the substrate with the composition thereon is capable of being heated at a temperature of about 100° C. or greater and more preferably about 120° C. or greater, even more preferably 130° C. or greater and most preferably about 140° C. or greater. Preferably the substrate with the composition thereon can be baked or dried by being heated to a temperature of about 200° C. or less, even more preferably about 180° C. or less and most preferably about 170° C. or less.

The substrate can be any structure for which damping of noise vibration and harshness is desired. It can be the shell of a machine or apparatus such as but not limited to an industrial machine, a washer, parts of an automobile and the like. In a preferred embodiment the substrate is a portion of an automobile, such as but not limited to the trunk well, wheel well, rocker panel, firewall, floorboards or underbody. Vertical surfaces of the vehicle can also be coated with the composition. Accordingly, the substrate can also include such vertical surfaces as door panels, body panels and any other vertical surface that it is desirable to dampen noise and vibration. In the embodiment wherein the substrate is an automobile, the composition is preferably dried or baked in an existing primer or paint oven of an automobile assembly line. Automobile assembly lines generally have two or three ovens on the automobile assembly line. Some automobile lines have an oven designed to gel the sealer. All automobile lines have ovens for curing the primer coat, the paint coat and clear coat. The composition can adequately dry in such ovens. It is necessary for the composition to dry without delamination and blisters. The composition adheres to the substrate and provides excellent damping properties.

Figure 2:
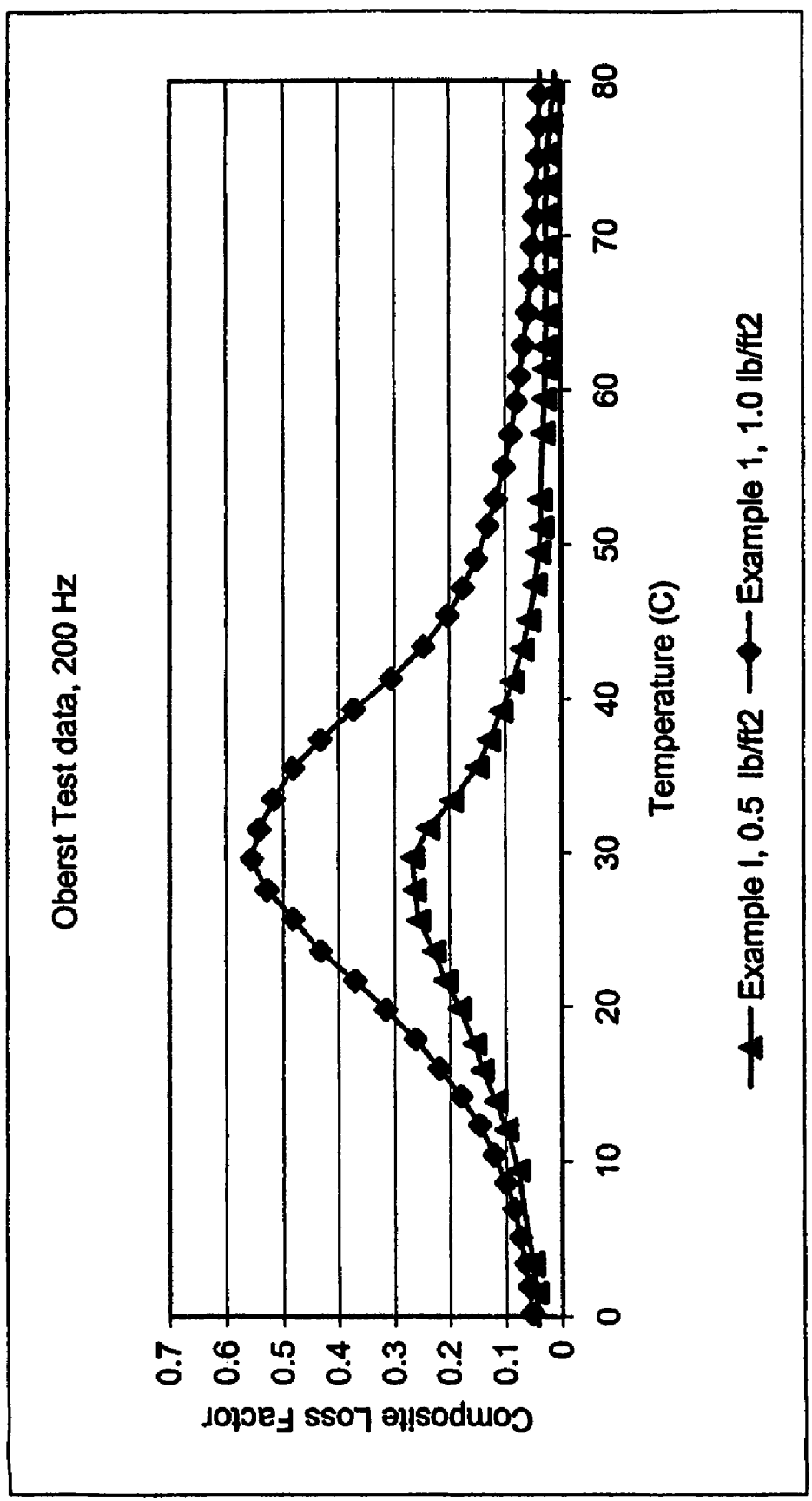
FIG. 2 is a graph showing test results.
Figure 3:
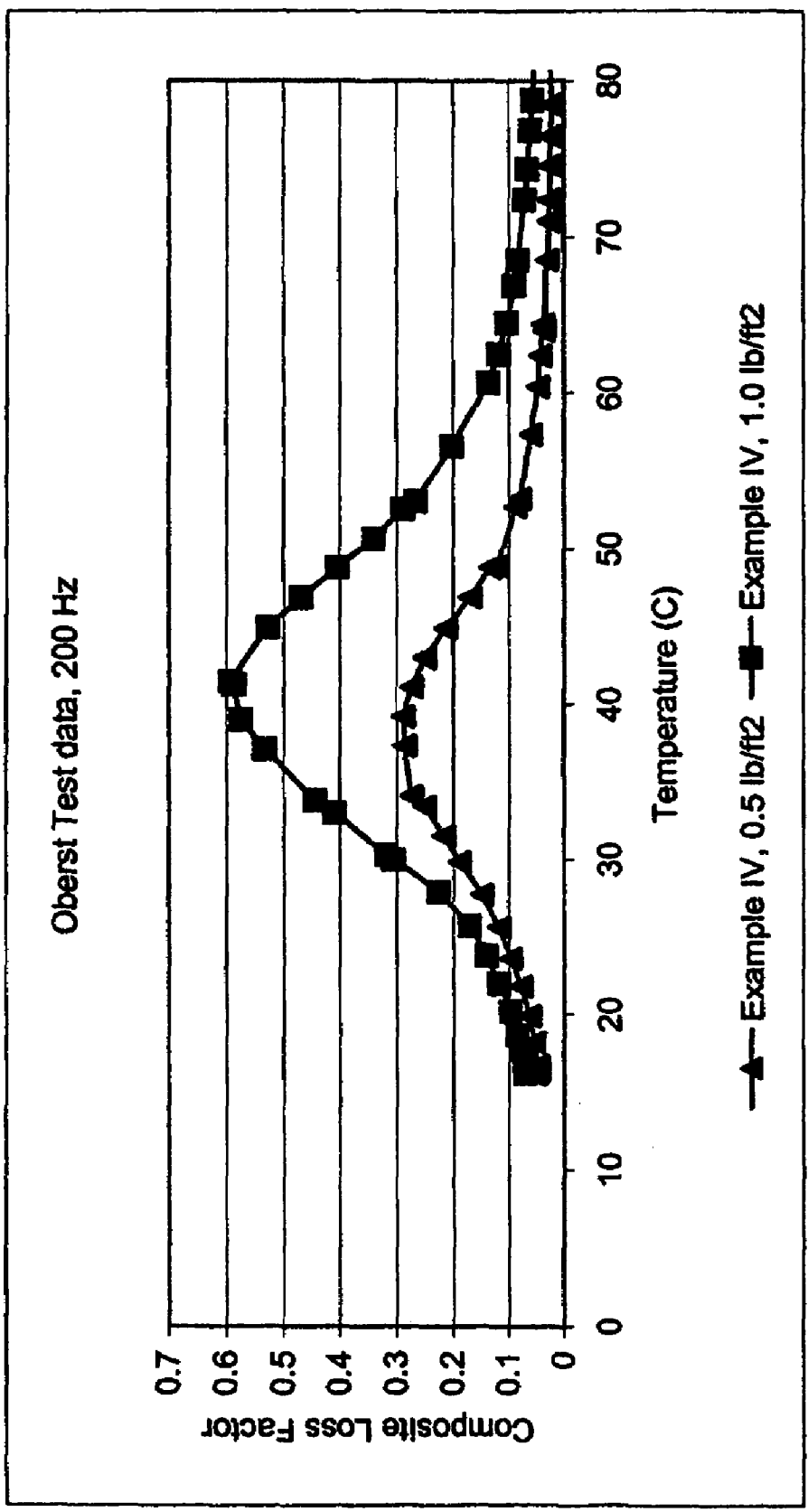
FIG. 3 is a graph showing additional test results.

The vibration damping property is checked by Oberst test method (SAE J1637). The results are shown in FIGS. 2 and 3. In each Figure, the composite loss factor is graphed against temperature.

The examples were applied to the substrate by multi-stream application (MSA). The samples were dried for 30 minutes at 140° C.

The composition according to the present invention can be dried or cured at room temperature, or elevated temperatures up to 200° C. with a broad range of open times and bubble-free, consistent coatings from between about 0.5 mm to about 6 mm exhibiting microcracking or microvoid formation. As is shown in FIGS. 2 and 3, the coated substrates exhibit improved noise and vibration properties. More specifically, FIGS. 2 and 3 depict the composite loss factor vs. temperature characteristics of two different film thicknesses (i.e., surface densities), one being 0.5 lbs./ft.$^2$ and the other being 1.0 lbs./ft$^2$. Still more particularly, FIG. 2 relates to the composition of Example I, at varying surface densities, and FIG. 3 relates to the composition of Example IV, at varying surface densities. Without being bound to a particular theory of the operation of the present invention, it is believed that a greater amount of latex in the formula produces enhanced noise and vibration properties (i.e., reduced transmission of noise and vibration). This is believed to be due, at least in part, more of the polymer being available to bend and deform, and thereby damp vibrations. The excellent bakeability is believed to be due, at least in part, to the high ATTAGEL (e.g., attapulgite clay) level in the composition, whereby the composition exhibits increased stiffness after application, and inhibits the re-flow of the multi-streamed applied composition onto itself. This apparent lack of reflow facilitates the formation of the microcracks which aid in allowing water to escape. These microcracks do not affect the damping characteristics of the composition. Further, it is believed that thicker films also will result in enhanced notice and vibration properties.

Thus compounds according to the present invention can be applied in film thickness of between about 0.5 to about 6 mm. The compounds are capable of being dried at ambient temperature or under heat, without the formation of blisters or cracks, due in part to the excellent bakeability of the composition of the present invention. The compound also has good vibration damping properties and abrasion resistance. Such compounds are beneficial as a coating to reduce noise and vibration properties of metal substrates.

The invention has been described in an illustrative manner and it is to be understood that the terminology that has been used is intended to be in the nature of words of description rather than of limitation. Many modifications and variations are possible in light of the above teaching. It is, therefore, to be understood that within the scope of the appended claims, the invention may be practiced other than as specifically described.

What is claimed is:

1. A latex-based composition, comprising:
   latex in an amount of between about 20 weight percent to about 40 weight percent based on the total weight of the composition;
   at least one filler in an amount of between about 45 weight percent to about 70 weight percent based on the total weight of the composition, wherein said filler includes at least one clay filler in an amount of between about 0.8 weight percent to about 2.5 weight percent, based on the total weight of the composition; and
   wherein said composition forms microcracks in or on a surface thereof.

2. The composition as set forth in claim 1, wherein said latex has a mean particle size in the range of about 1000 to about 5000 Angstroms.

3. The composition as set forth in claim 1, wherein said microcracks form upon the drying or curing of the composition.

4. The composition as set forth in claim 1, wherein said latex is present in an amount in the range of about 28 weight percent to about 35 weight percent, based on the total weight of the composition.

5. The composition as set forth in claim 1, wherein said latex is present in an amount in the range of about 30 weight percent to about 34 weight percent, based on the total weight of the composition.

6. The composition as set forth in claim 1, wherein the clay filler is comprised of an attapulgite clay.

7. The composition as set forth in claim 1, further comprising a dispersant in an amount of between about 0.1 weight percent to about 1 weight percent, based on the total weight of the composition.

8. The composition as set forth in claim 7, further comprising a surfactant in an amount of at least about 0.15 weight percent, based on the total weight of the composition.

9. The composition as set forth in claim 1, wherein said latex comprises a material selected from the group consisting of acrylic copolymers, vinyl acrylics, and combinations thereof.

10. The composition as set forth in claim 9, wherein said latex has a glass transition temperature in the range of between about 0° C. to about 50° C.

11. The composition as set forth in claim 1, wherein said microcracks aid in releasing water upon drying or curing.

12. A latex-based composition, comprising:
   latex in an amount of between about 20 weight percent to about 40 weight percent based on the total weight of the composition, wherein said latex has a mean particle size in the range of about 1000 to about 5000 Angstroms; and
   at least one filler in an amount of between about 45 weight percent to about 70 weight percent based on the total weight of the composition, wherein said filler includes at least one clay filler in an amount of between about 0.8 weight percent to about 2.5 weight percent, based on the total weight of the composition; and
   wherein said composition forms microcracks in or on a surface thereof upon drying or curing.

13. The composition as set forth in claim 12, wherein said latex is present in an amount in the range of about 28 weight percent to about 35 weight percent, based on the total weight of the composition.

14. The composition as set forth in claim 12, wherein said latex is present in an amount in the range of about 30 weight percent to about 34 weight percent, based on the total weight of the composition.

15. The composition as set forth in claim 12, wherein the clay filler is comprised of an attapulgite clay.

16. The composition as set forth in claim 12, further comprising a dispersant in an amount of between about 0.1 weight percent to about 1 weight percent, based on the total weight of the composition.

17. The composition as set forth in claim 16, further comprising a surfactant in an amount of at least about 0.15 weight percent, based on the total weight of the composition.

18. The composition as set forth in claim 12, wherein said latex comprises a material selected from the group consisting of acrylic copolymers, vinyl acrylics, and combinations thereof.

19. The composition as set forth in claim 18, wherein said latex has a glass transition temperature in the range of between about 0° C. to about 50° C.

20. The composition as set forth in claim 12, wherein said microcracks aid in releasing water upon drying or curing.

21. A method for forming a latex-based composition, comprising:
   providing latex in an amount of between about 20 weight percent to about 40 weight percent and having a mean particle size of between about 1000 and 5000 Angstroms;
   providing at least one filler in an amount of between about 45 weight percent to about 70 weight percent, wherein said filler includes at least one clay filler in an amount of between about 0.8 weight percent to about 2.5 weight percent, based on the total weight of the composition; and
   combining said latex and said at least one filler.

22. The method as set forth in claim 21, further comprising drying or curing the composition, wherein microcracks form on or in a surface of the composition.

23. The method as set forth in claim 21, further comprising providing a dispersant in an amount of between about 0.1 weight percent to about 1 weight percent, based on the total weight of the composition.

24. The method as set forth in claim 23, further comprising providing a surfactant in an amount of at least about 0.15 weight percent, based on the total weight of the composition.

25. The method as set forth in claim 21, wherein said latex comprises a material selected from the group consisting of acrylic copolymers, vinyl acrylics, and combinations thereof.

26. The method as set forth in claim 25 wherein said latex has a glass transition temperature in the range of between about 0° C. to about 50° C.

27. The method as set forth in claim 22, wherein said microcracks aid in releasing water upon drying or curing.

28. A method of forming a damper, comprising:
   applying the composition of claim 1 to a substrate; and
   curing said composition;
   wherein said composition forms a plurality of microcracks therein or thereon for aiding in releasing water from said composition.

29. The method as set forth in claim 28, wherein said latex in present in an amount of between about 20 weight percent to about 40 weight percent, based on the total weight of the composition, and has a mean particle size of between about 1000 and 5000 Angstroms.

* * * * *